United States Patent Office 3,135,871
Patented June 2, 1964

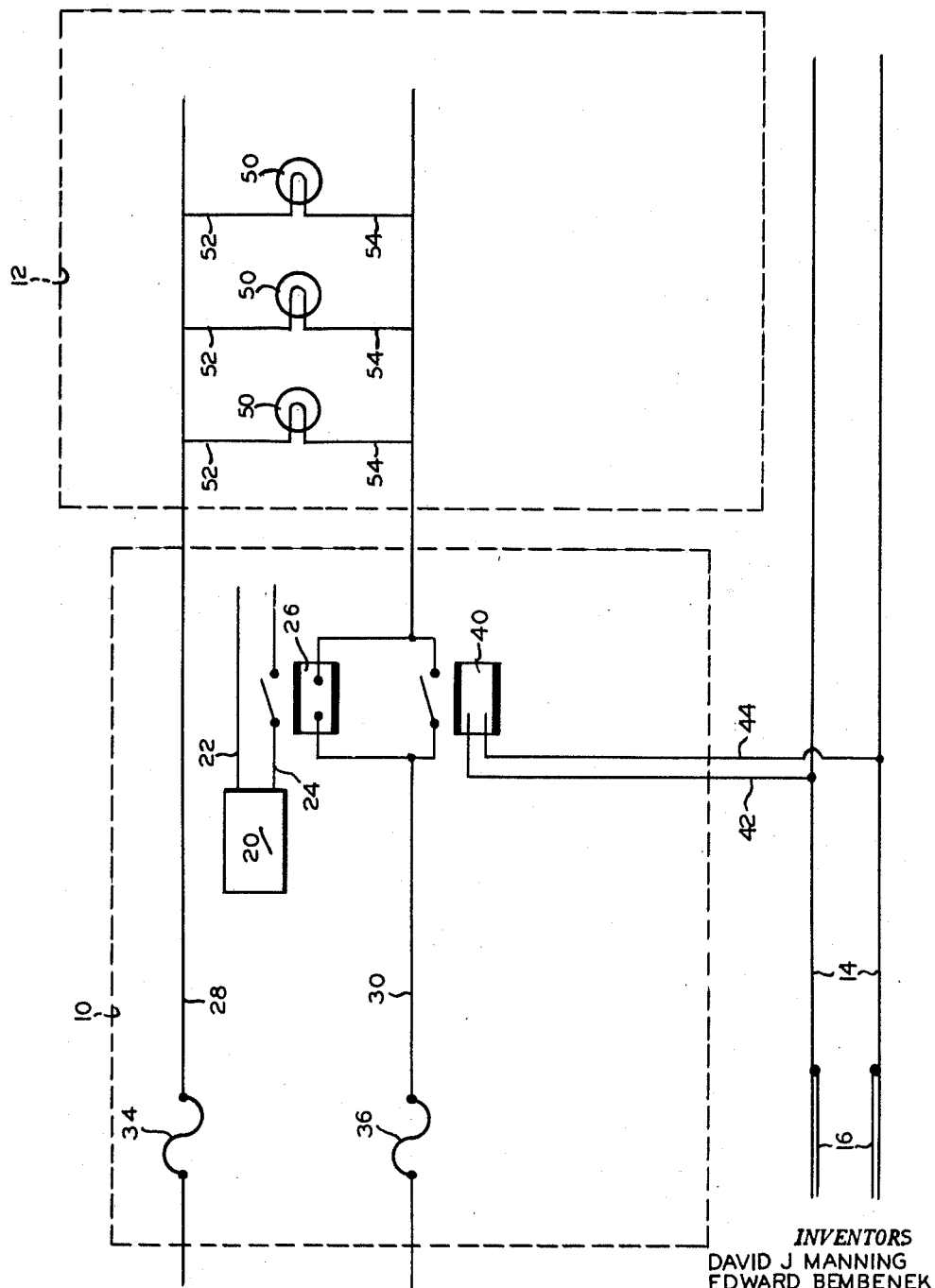

3,135,871
CONTROL CIRCUIT MEANS FOR SUPERVISING FUSES AND WIRES
David J. Manning and Edward Bembenek, Springfield, Mass., assignors to The Standard Electric Time Co., Springfield, Mass.
Filed Mar. 14, 1960, Ser. No. 14,882
1 Claim. (Cl. 307—64)

Our invention relates to new and useful improvements in an emergency or stand-by electrical system and is directed more particularly to a control circuit means for continuously monitoring the continuity of the fuses and wires of the said emergency or auxiliary electrical system while same is not in direct use.

It is a principal object of our invention to provide a unique control circuit system for use in conjunction with an emergency lighting and alarm system of the type which is installed in buildings and the like as an adjunct to the normal lighting service to provide emergency facilities upon failure of said service.

The invention broadly envisions improvements in an emergency signalling means whereby said emergency signalling means is continuously monitored in manner so as to indicate a failure of continuity when and as a fault condition exists. Fuse failure or the breakage or disconnection of wires and the like in the emergency signalling means are detectable by means hereof inasmuch as any interruption in the so-called continuity line, which may comprise a secondary line of D.C. current, causes the energization of a failure alarm. In this way, the auxiliary or emergency lighting circuit may be maintained in a continuously operative condition.

An emergency lighting system, as is well known, is normally supplied with energy from an emergency power supply and employed during an emergency, such as a failure of the normal or main power supply, it being understood that said emergency power supply is maintained in a condition of readiness, so that in the event of such emergency and consequent power failure, the circuits of the emergency lighting system are automatically energized and rendered operative.

It is obviously desirable and essential that the emergency lighting system be in operable condition at all times so as to be capable of the lighting function during said emergencies. However, as is known, such emergency lighting systems and the circuits thereof, during the normal non-emergency periods, are frequently rendered inoperative by blown fuses or ruptured or disconnected wiring, and worse, such inoperativeness may not be made known. In such instance, the system is rendered inoperative for its intended function in an emergency and the existence of such a condition may not be discovered in time to avert disaster.

Ideally, the emergency power supply is at all times in an operative condition for the supply of energy to the emergency lighting system, with a supplemental trouble signal means coacting therewith so that, in the event that the emergency system is rendered inoperative, there is an indication thereof wherefor the said condition of inoperativeness may be readily remedied.

According to the novel features of this invention, there is provided means which is adapted, during non-emergency periods, to monitor the auxiliary or secondary emergency or stand-by system as to the continuity of the fuses and wires in said system in manner to indicate automatically the inoperativeness thereof, as and when its inoperativeness may occur.

In a broad way, means is provided for indicating the inoperativeness of the emergency lighting system so that the deficiency may be detected and the correction thereof made timely so that the emergency lighting system is once again made ready for its emergency function, if and when necessitated.

It is a salient object hereof to provide an improved emergency or stand-by system, as set forth above, which is reliable and foolproof in its operation, inexpensive in its fabrication, simple in its construction, and economical in its maintenance.

It is another object of the present invention to provide an improved stand-by emergency lighting system which will set off a trouble alarm in the event of a failure of any fuse or wire in the stand-by or secondary emergency circuit.

It is a still further object hereof to obviate the need for the routine periodic test procedures, with their attendant inconveniences and expense, which the normal emergency lighting systems require. Herein, it is not necessary to periodically check the emergency lighting circuit since any defect thereof which occurs, even though the circuit is not being directly used, will cause a signal (visual or audible or both) to be given.

Aditionally, it is an object hereof to provide a novel and improved electrical system for emergency or stand-by use incorporating a means whereby defects or failures in the components or wires thereof, during the normal intervals when the emergency system is not being actively used, are indicated.

Stated otherwise, an object hereof can be understood to consist of providing an improved electrical standby system having supervisory means incorporated therein wherein a trouble signal is actuated upon a failure occurring in the said stand-by system.

In the drawing annexed to this specification, the figure is a schematic circuit diagram illustrative of the supervisory means for the emergency electrical system of lighting of the invention.

It will be first understood that the emergency lighting system per se does not form a part of the present invention and therefore is not shown or described in detail. Same may be understood to include a standby source of electrical power independent of the regular source of power and a stand-by lighting circuit separate from the regular lighting circuit, together with means for connecting the stand-by lighting circuit to the stand-by source of power upon failure of the regular source of power.

The supervisory or monitoring apparatus comprises a power and control unit which may be designated generally as being preferentially disposed within a control panel delineated by the dash-lines 10. It will be understood, of course, that certain of such components may be located distantly thereof and without the control panel, if circumstances so dictate.

The building or other structure in which the system hereof may be installed is delineated by the dash-lines 12.

The normal or regular service power supply common in buildings is represented by 14 and originates from a primary power source 16. Same may comprise a 120 or 220 volt A.C. line, such as is common in buildings and other structures.

In accordance with the present invention, a failure alarm or trouble signal 20 is provided and may be of any suitable electromechanical or electrical type. The alarm may be visual or audible or both. Details thereof are not shown here, since they are not involved per se in the invention, and further since different types of alarms may be used, all without departing from the spirit and scope of the invention.

Said failure alarm 20 is powered by a separate source of voltage (not shown) leading thereto through feeders 22 and 24.

In one of said feeders, as for example feeder 24, the circuit closing arm of a relay 26 is disposed and is normally biased to circuit open position.

The coil of said relay 26 is disposed in one of the lines 28, 30 of a secondary or continuity circuit, which circuit is powered from a source of D.C. power (not shown) and functions as the emergency circuit.

Fuses 34, 36 may be disposed along said lines 28, 30 of said emergency circuit.

The relay 26 is of a high resistance type and when de-energized, the circuit closing arm thereof is releasably moved to the closed position wherefor the monitoring circuit through the failure alarm 20 is completed and the alarm is automatically activated.

The coil of a relay 40 is connected by connections 42, 44 to the regular A.C. power line 14.

The circuit closing arm of relay 40 is disposed in the line 30 of the secondary or continuity circuit and is normally biased to circuit open position.

During any power failure in the A.C. line, such as a rupture therein, the circuit closing arm of relay 40 is closed wherefor the connection 30 is directly connected to the lights 50 and shuts the relay 26.

One or more emergency lights or lamps 50 are provided along the secondary or continuity D.C. circuit 28, 30, the terminals thereof being connected therebetween by connections 52 and 54. Any desired number of such lamps may be employed and may be located within the building at appropriate locations.

Normally, the voltage in the secondary or continuity circuit is such as to maintain the coil of relay 26 energized and to keep the contact arm thereof in open position but is appreciably under the rated current for the lights 50 wherefor same have no useful or appreciable illumination. Sufficient voltage runs through the lights 50 however so as to offset the known deleterious effects of thermal shock when the rated current is delivered thereto.

By such organization of coactive components, any failure or interruption in the secondary or continuity circuit 28, 30 results in the functioning of the relay 26 to bias the circuit closing arm thereof wherefor the trouble signal circuit is energized and the trouble signal 20 therein is energized.

If a plurality of supervisory circuits are interconnected to a main supervisory circuit, as may be desired and as is usual in large installations, it is conceivable that the relay 26 of each said secondary circuit may be of the type capable of opening a circuit instead of closing a circuit as is herein indicated. That is, it may be normally closed and adapted to open upon sensing a trouble condition.

In summation, it will be observed that what is essentially involved here is an improved continuously monitoring means whereby a trouble signal will be automatically given whenever there is a failure in the secondary circuit and simultaneously therewith, the nominal rated current of the load (trouble lamps 50) accomplishes the light of same which may be distributed at discreet locations throughout the installation.

From the foregoing, it will be seen that we have provided a novel and improved control circuit means of a standby electrical system for continuously monitoring the continuity of the fuses and building wires and wherein any failure of these components will result in both visual and audible signals being given and by means of which the correction of the fault may be made.

We claim:

In a control system for continuously monitoring during non-emergency periods the continuity of the fuses and wires of an emergency electrical system including a stand-by power source and stand-by electrical circuit energized thereby and independent of a regular electrical service including a regular power source and regular electrical circuit energized thereby to provide emergency facilities in the event of any failure of the regular service, and comprising a monitoring source of electrical power independent of the regular and stand-by power sources, a normally-open monitoring electrical circuit separate from the regular and stand-by electrical circuits and connected to said monitoring power source for energization therefrom, a failure signal connected in said monitoring electrical circuit, automatic means for completing said monitoring electrical circuit and energizing said failure signal in response to any failure of continuity in the stand-by electrical circuit and including a failure signal relay having an exciting coil connected to the stand-by electrical circuit and a circuit-closing arm connected to said monitoring electrical circuit, the circuit-closing arm of the failure signal relay being normally biased to monitoring electrical circuit-open position and being responsive upon coil deenergization due to a failure of continuity in the stand-by electrical circuit for movement to monitoring electrical circuit-closed position and energization of said failure signal a first signal means in the stand-by electrical circuit for automatically indicating failure in the regular electrical service, and a first signal relay having an exciting coil connected to the regular electrical circuit and a circuit-closing arm in the stand-by electrical circuit, the circuit-closing arm of the first signal relay being normally biased to stand-by electrical circuit-open position and being responsive upon coil deenergization for movement to emergency electrical circuit-closed position and energization of said first signal means.

References Cited in the file of this patent

UNITED STATES PATENTS

| | | |
|---|---|---|
| 1,650,676 | Williams | Nov. 29, 1927 |
| 2,074,261 | Grant | Mar. 16, 1937 |
| 2,302,192 | Dannheiser | Nov. 17, 1942 |